United States Patent
Kline et al.

(10) Patent No.: US 11,068,610 B2
(45) Date of Patent: Jul. 20, 2021

(54) SECURING DIGITAL CONTENT ON MOBILE DEVICES

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 120 days.

(21) Appl. No.: 16/013,011

(22) Filed: Jun. 20, 2018

(65) Prior Publication Data
US 2019/0392160 A1 Dec. 26, 2019

(51) Int. Cl.
G06F 21/62 (2013.01)
G06F 21/60 (2013.01)

(52) U.S. Cl.
CPC ........ G06F 21/6218 (2013.01); G06F 21/604 (2013.01)

(58) Field of Classification Search
CPC .... G06F 16/9535; G06F 21/10; G06F 16/437; G06F 16/7867; G06F 16/24; G06F 21/121; G06F 2221/2117; G06F 9/445; G06F 16/48; G06F 3/04842; G06F 21/6218; G06F 21/60; G06F 21/1686; G06F 21/6245; G06F 21/82; G06F 21/604; H04L 67/306; H04L 65/4084; H04W 4/21; H04W 4/025
See application file for complete search history.

(56) References Cited

U.S. PATENT DOCUMENTS

| | | | | |
|---|---|---|---|---|
| 8,922,480 | B1* | 12/2014 | Freed | G06F 21/60 345/156 |
| 9,030,404 | B2* | 5/2015 | Linsky | G06F 1/163 345/156 |
| 9,681,165 | B1* | 6/2017 | Gupta | H04N 21/2541 |
| 10,740,624 | B2* | 8/2020 | Muhammad | H04N 21/44218 |
| 2010/0124949 | A1 | 5/2010 | Demuynck et al. | |

(Continued)

OTHER PUBLICATIONS

P. Chi, "Weave: Scripting Cross-Device Wearable Interaction." In Proceedings of the 33rd Annual ACM Conference on Human Factors in Computing Systems (CHI '15). ACM, New York, NY, USA, 3923-3932, 2015.

(Continued)

*Primary Examiner* — Carl G Colin
*Assistant Examiner* — Andrew Suh
(74) *Attorney, Agent, or Firm* — Cantor Colburn LLP; Tihon Poltavets (57) ABSTRACT

Embodiments include method, systems and computer program products for securing content. Aspects include accessing, by a first user device, content, wherein the content includes a security profile associated with the content. The content is displayed on a display for the first user device. An input is received by the first user device. The input is analyzed to determine that the input is in compliance with the security profile associated with the content and based at least in part on determining the input is not in compliance with the security profile associated with the content, a portion of the content is transmitted to a second user device.

15 Claims, 5 Drawing Sheets

(56) References Cited

U.S. PATENT DOCUMENTS

| | | | |
|---|---|---|---|
| 2014/0157424 A1* | 6/2014 | Lee | G06F 21/6245 |
| | | | 726/26 |
| 2014/0253412 A1 | 9/2014 | Blaich et al. | |
| 2014/0304516 A1* | 10/2014 | Fahmy | H04L 63/08 |
| | | | 713/176 |
| 2017/0163578 A1 | 6/2017 | Deluca et al. | |
| 2017/0228549 A1* | 8/2017 | Xuan | G06F 21/62 |
| 2017/0243020 A1* | 8/2017 | Dhondse | G06F 21/62 |
| 2018/0007155 A1* | 1/2018 | Saito | G06Q 30/0207 |
| 2018/0329622 A1* | 11/2018 | Missig | G06F 1/1613 |
| 2019/0377891 A1* | 12/2019 | Krieger | G06F 21/31 |

OTHER PUBLICATIONS

S. Houben, "WatchConnect: A Toolkit for Prototyping Smartwatch-Centric Cross-Device Applications." In Proceedings of the 33rd Annual ACM Conference on Human Factors in Computing Systems (CHI '15). ACM, New York, NY, USA, 1247-1256, 2015.

X. Chen, "Duet: exploring joint interactions on a smart phone and a smart watch." In Proceedings of the SIGCHI Conference on Human Factors in Computing Systems (CHI '14). ACM, New York, NY, USA, 159-168, 2014.

* cited by examiner

SECURING DIGITAL CONTENT ON MOBILE DEVICES

BACKGROUND

The present invention generally relates to digital security, and more specifically, to securing digital content on a mobile user device.

In today's security conscious world, it is important to secure a user's digital content from potential prying eyes or intruders. With frequent business travel and flexibility to work outside of traditional offices, imposing restrictions on the access of digital content can be a challenge. A user can perform various actions on a user device which bring up a potentially sensitive menu or sensitive content in a file displayed on the user device. Nowadays, more and more content can be accessed and displayed on mobile user devices allowing for potentially sensitive content and potentially sensitive actions performed on the content to be seen in public.

SUMMARY

Embodiments of the present invention are directed to a computer-implemented method for securing content. A non-limiting example of the computer-implemented method includes accessing, by a first user device, content, wherein the content includes a security profile associated with the content. The content is displayed on a display for the first user device. An input is received by the first user device. The input is analyzed to determine that the input is in compliance with the security profile associated with the content and based at least in part on determining the input is not in compliance with the security profile associated with the content, a portion of the content is transmitted to a second user device.

Embodiments of the present invention are directed to a system for securing content. A non-limiting example of the system includes a processor on a first user device configured to access, by a first user device, content, wherein the content includes a security profile associated with the content. The content is displayed on a display for the first user device. An input is received by the first user device. The input is analyzed to determine that the input is in compliance with the security profile associated with the content and based at least in part on determining the input is not in compliance with the security profile associated with the content, a portion of the content is transmitted to a second user device.

Embodiments of the invention are directed to a computer program product for securing content. The computer program product comprising a computer readable storage medium having program instructions embodied therewith. The program instructions are executable by a processor to cause the processor to perform a method. A non-limiting example of the method includes accessing, by a first user device, content, wherein the content includes a security profile associated with the content. The content is displayed on a display for the first user device. An input is received by the first user device. The input is analyzed to determine that the input is in compliance with the security profile associated with the content and based at least in part on determining the input is not in compliance with the security profile associated with the content, a portion of the content is transmitted to a second user device.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
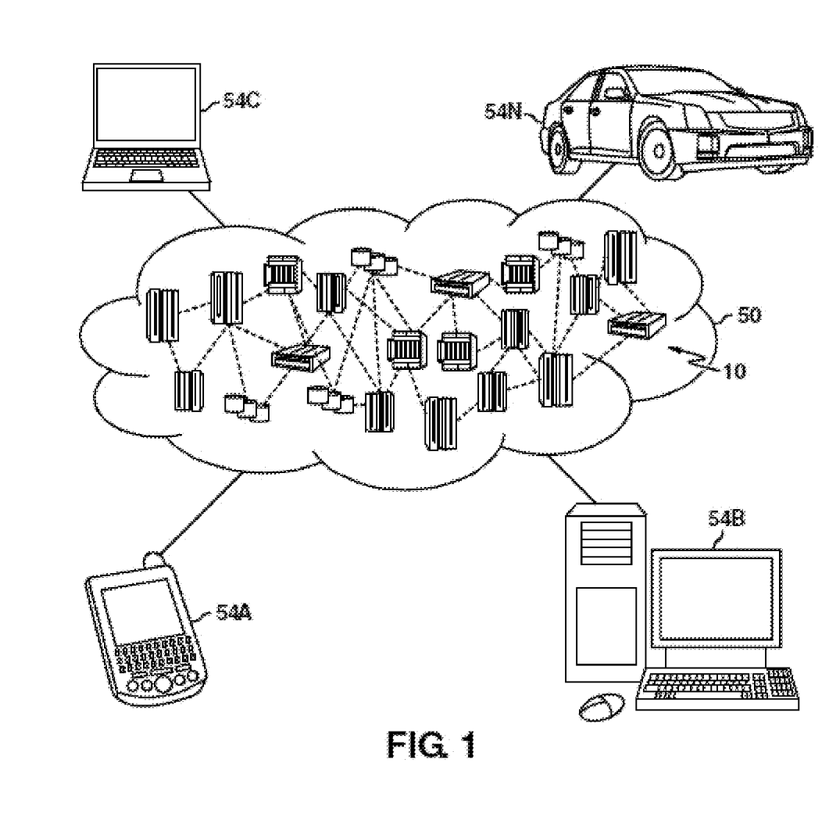
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
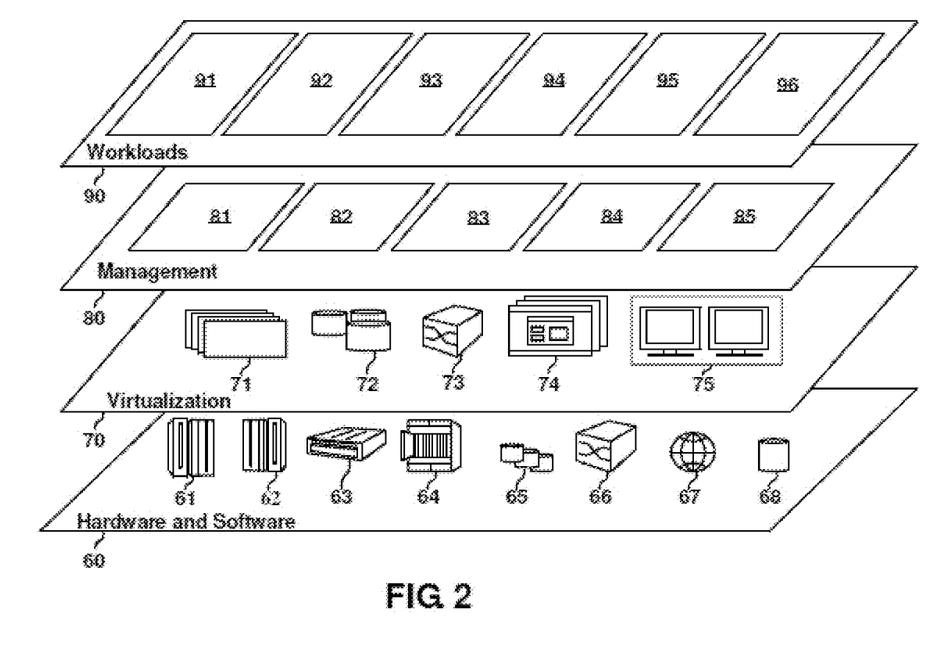
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and securing content 96.

Figure 3:
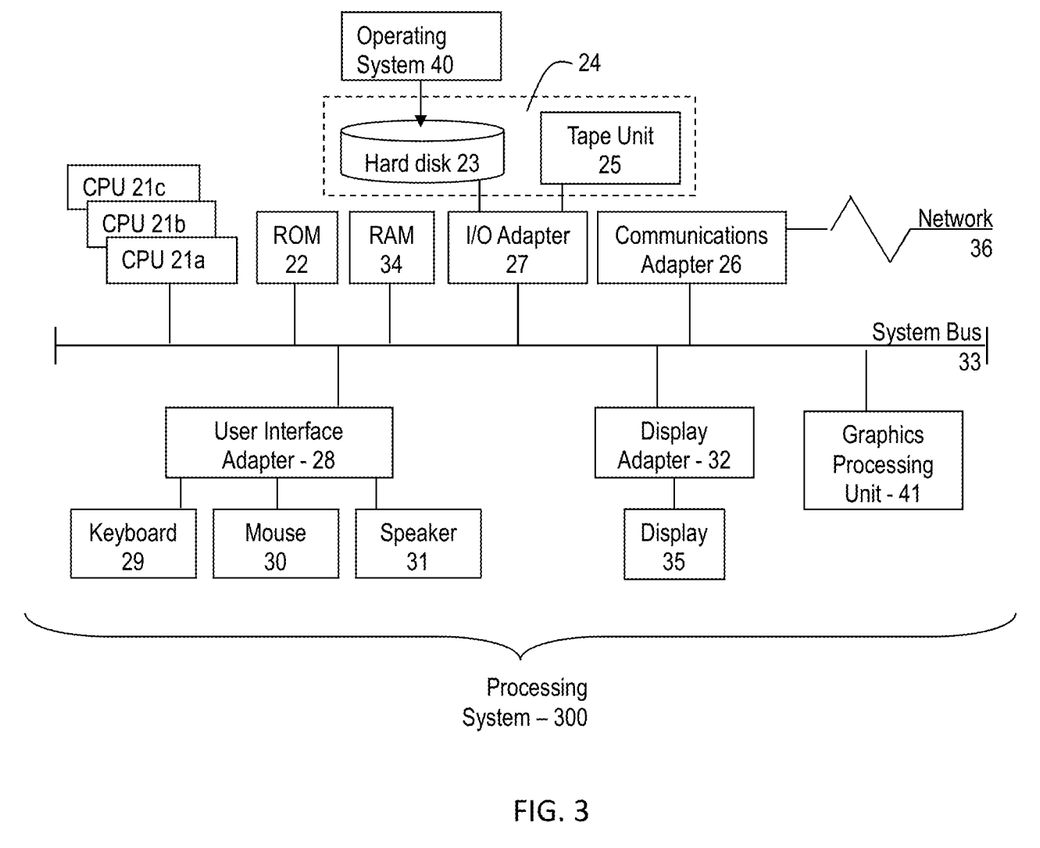
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, content security has been an ever increasing focus for security experts because of the increased mobility of user devices. As more and more individuals' access work and other sensitive data using laptops, smart phones, and tablets, the potential for sensitive information being available to people passing by is increasing. Typically, individuals that are accessing this sensitive data often rely on their own subjective determinations as to whether an unauthorized individual can view sensitive content on their mobile device. For example, an individual working on a laptop computer in a public airport might sit away from other individuals or sit so that their back is facing a wall to avoid potential intrusion. However, as more and more people access sensitive content using mobile phones and tablets, it becomes more difficult to subjectively determine whether the content they are viewing is secure and away from prying individuals. Also, often only a portion of the content being viewed would be sensitive such as banking account information and the like. A need to secure potentially sensitive content when being accessed by a mobile device exists.

Turning now to an overview of the aspects of the invention, one or more embodiments of the invention address the above-described shortcomings of the prior art by providing methods and systems for securing content on mobile device display screens. When secured content is displayed on a display screen for a mobile user device, security actions can be performed while the user is in an unsecure location. For example, a user may be accessing confidential emails from his or her smart phone while travelling through an airport. The user's interactions with the confidential email could be visible to other people at the airport and could potentially violate the confidentiality of the email content. To avoid this, aspects of the present invention include transmitting portions of the content being accessed to a smaller user device such as a smart watch and removing the portions of the content from the larger screen of a tablet, laptop, or mobile phone. The portion of the content removed from the larger user device could be, for example, financial data that is transmitted and displayed on a smaller device such as a phone or smart watch. In addition, any manipulation of the content can be performed on the smaller user device such as accessing popup menus or other types of menus for the content displayed and the selection from the menu can be performed on a user's smart watch to avoid sensitive content from being displayed on the larger screen of the larger user device.

Figure 4:
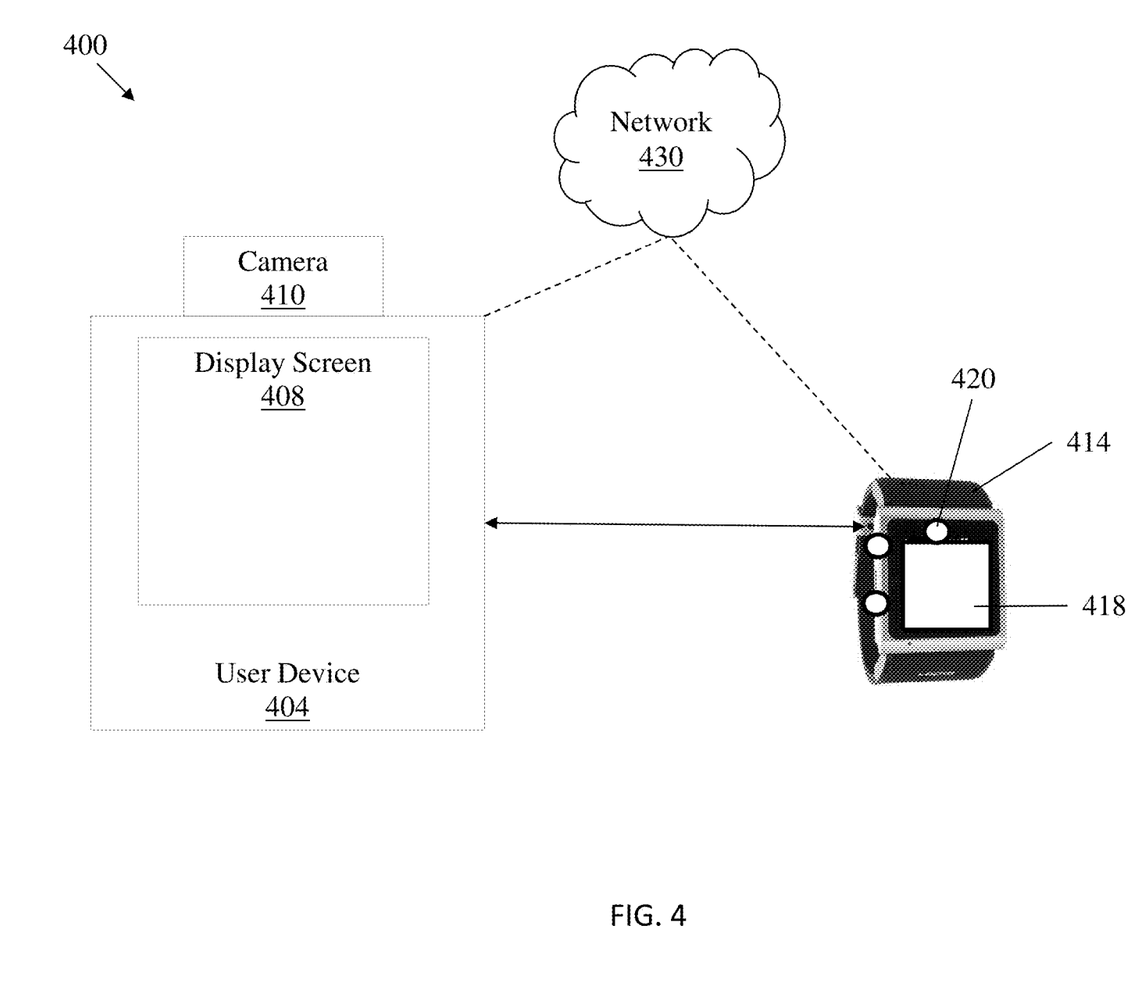
FIG. 4 depicts a block diagram of a system for securing content according to embodiments of the invention.

Turning now to a more detailed description of aspects of the present invention, FIG. 4 depicts a block diagram of a system 400 for securing content according to embodiments of the invention. The system 400 includes a first user device 404 having a display screen 408 and a camera 410. The system 400 also includes a second user device 414 having a second display screen 418 and a second camera 420. Each of the first user device 404 and the second user device 414 can access a network 430 via any wired or wireless networking hardware included in the devices. Also, the first user device 404 and the second user device 414 can include any means of communicating with each other through protocols such as Bluetooth®, near field communication, Wi-Fi, and the like.

In one or more embodiments of the invention, the first user device 404 can access content either stored locally on the device or from a network 430 connected to a server. The content being accessed can include a security profile that can dictate security restrictions for accessing the content. The security profile for the content can dictate what part of the content of a file being accessed is sensitive or requires a certain level of security before being viewed. For example, the security profile might require financial data in a file to be viewed securely. In one or more embodiments, while viewing financial data on the first user device 404, the security profile could require the financial data to be blanked out or removed from the display screen 408 and transmit the financial data to the second user device 414 having a smaller, more secure display screen 418. The financial data can be transmitted from the first user device 404 to the second user device 414 through a paired connection using near field communication (NFC) and the like. Or the financial data can be transmitted through the network 430 to the second user device 414 by the first user device 404 based on the security profile.

In one or more embodiments of the invention, the system 400 can conceal any action taken by a user on a file while using the first user device 404. The first user device 404 can be, for example, a laptop, tablet, and/or smart phone device. When certain actions are taken on a file such as accessing a menu or making a change to the file, the menu or change can be displayed on the display screen 418 of the second user device 414. The second user device 414 can be, for example, a smart phone or smartwatch having a smaller display screen 418 or a more concealable display screen than the display screen 408 on the first user device 404. The user can manipulate the menu or even the secure content on the second user device 414 and the changes can take effect on the first user device 404.

In one or more embodiments, when secure content is being accessed by the first user device 404, the security profile associated with the secured content can be utilized to establish security measures for the content displayed on the first user device 404. The first user device 404 can include a camera 410 that can utilize facial recognition to determine the identity of the user accessing the content to see if their access complies with the security profile. Also, the camera 410 can collect environmental data associated with the user device 404. For example, the camera 410 can collect images of other people in the vicinity of the first user device 404 and determine if these other people have access to the content. If the environmental data shows that the content might be available to unauthorized people, the first user device 404 can enter a secure mode where any secured content is transmitted to the second user device 414 for more secure viewing by the user. The first user device 404 can continuously monitor the environmental data collected from the camera 410 to determine if the first user device 404 enters a more secure area such as an office or enclosed area without unauthorized individuals. When this is determined based on the environmental data, the first user device 404 can change mode to a non-secure mode and the sensitive content can be displayed on the display screen 408. While in the secure mode, the sensitive content displayed on the display screen 408 can be blanked out, removed, or otherwise concealed on the display screen 408. The second user device 414 receives the secured content and displays on the display screen 418. When the secured content or any content is transmitted to the second user device 414, the second user device 414 can send an alert to the user to notify the user that the sensitive content can be viewed on the second user device 414. The alert can be a visual, audio, and/or haptic feedback to the user. For example, if the second user device 414 is a smart watch, the smart watch might vibrate on the user's arm to notify them to look at the smart watch display.

In one or more embodiments, the security profile for the file or content being accessed by the first user device 404 can include restrictions on viewing certain content outside certain locations. For example, viewing content outside an office campus can cause the first user device 404 to enter a secure mode and transmit portions of the content to the second user device 414. In another example, a document being viewed on a laptop might be International Traffic in Arms Regulations (ITAR) classified. When the laptop GPS shows the laptop outside the country, the secure mode can be triggered on the laptop and any sensitive content can be displayed on the user's phone and removed or blanked from the laptop screen.

Figure 5:
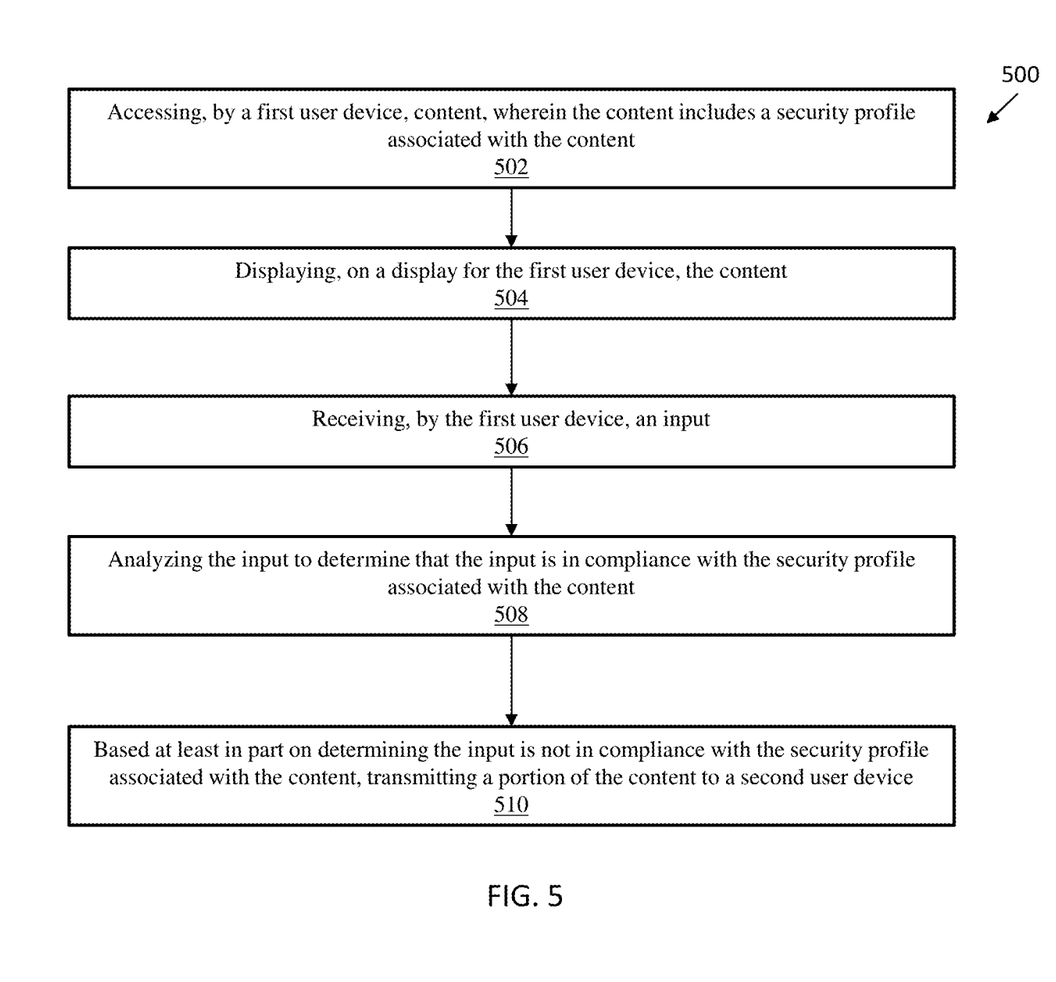
FIG. 5 depicts a flow diagram of a method for securing content according to one or more embodiments of the invention.

FIG. 5 depicts a flow diagram of a method for securing content according to one or more embodiments of the invention. The method 500 includes accessing, by a first user device, content, wherein the content includes a security profile associated with the content, as shown in block 502. At block 504, the method 500 includes displaying, on a display for the first user device, the content. The method 500, at block 506, includes receiving, by the first user device, an input. The method 500 includes analyzing the input to determine that the input is in compliance with the security profile associated with the content, at block 508. And at block 510, the method 500 includes based at least in part on determining the input is not in compliance with the security profile associated with the content, transmitting a portion of the content to a second user device.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for securing content, the method comprising:
   accessing, by a first user device, content, wherein the content includes a security profile associated with the content;
   displaying, on a first display for the first user device, the content;
   receiving, by the first user device, an input, wherein the input comprises an alteration to the content, and wherein the input further comprises environmental data obtained from one or more sensors associated with the first user device;
   analyzing the input to determine that the input is in compliance with the security profile associated with the content;
   based at least in part on determining the input is not in compliance with the security profile associated with the content, transmitting a portion of the content to a second user device, wherein the portion of the content comprises the alteration to the content displayed on a second display for the second user device;
   periodically obtaining, by the one or more sensors associated with the first user device, the environmental data while the content is being displayed, wherein the environmental data comprises facial recognition data associated with a location of the first device captured by the one or more sensors;
   transmitting the portion of the content to the second user device based on determining that the environmental data is not in compliance with the security profile associated with the content, wherein determining that the environmental data is not in compliance with the security profile associated with the content comprises:
   analyzing the facial recognition data to determine an unauthorized viewer within view of the first user device; and
   causing the second user device to vibrate based on the portion of the content being transmitted to the second user device.

2. The computer-implemented method of claim 1 further comprising invoking a security measure for the content on the display for the first user device.

3. The computer-implemented method of claim 2, wherein the security measure includes at least one of invoking a screen saver for the display of the first user device, blanking the display of the first user device, blanking the portion of the content on the display, turning off the display of the user device, and removing the portion of the content from the display.

4. The computer-implemented method of claim 1, wherein the environmental data comprises a location of the first user device.

5. The computer-implemented method of claim 1 further comprising transmitting an alert to the second user device responsive to transmitting the portion of the content to the second user device.

6. The computer-implemented method of claim 5, wherein the alert comprises haptic feedback delivered to a user by the second user device.

7. The computer-implemented method of claim 1, wherein the receiving the input comprises receiving, from a user, a request to access the menu for the content.

8. The computer-implemented method of claim 1, wherein the portion of the content comprises secured content defined by the security profile associated with the content.

9. The computer-implemented method of claim 1, wherein the second user device is a smart watch.

10. A system for securing content, the system comprising:
    a processor on a first user device configured to:
       access content, wherein the content includes a security profile associated with the content;
       display, on a first display for the first user device, the content;
       receive, by the first user device, an input, wherein the input comprises an alteration to the content, and wherein the input further comprises environmental data obtained from one or more sensors associated with the first user device;
       analyze the input to determine that the input is in compliance with a security profile associated with the content;
       based at least in part on determining the input is not in compliance with the security profile associated with the content, transmit a portion of the content to a second user device, wherein the portion of the content comprises a the alteration to the content displayed on a second display for the second user device;
    periodically obtaining, by the one or more sensors associated with the first user device, the environmental data while the content is being displayed, wherein the environmental data comprises facial recognition data associated with a location of the first device captured by the one or more sensors;
    transmitting the portion of the content to the second user device based on determining that the environmental data is not in compliance with the security profile associated with the content, wherein determining that the environmental data is not in compliance with the security profile associated with the content comprises:
    analyzing the facial recognition data to determine an unauthorized viewer within view of the first user device; and
    causing the second user device to vibrate based on the portion of the content being transmitted to the second user device.

11. The system of claim 10, wherein the processor is further configured to invoke a security measure for the content on the display for the first user device.

12. The system of claim 10, wherein the environmental data includes a location of the first user device.

13. The system of claim 10, wherein the processor is further configured to transmit an alert to the second user device responsive to transmitting the portion of the content to the second user device.

14. A computer program product for securing content, the computer program product comprising a computer readable storage medium having program instructions embodied therewith, wherein the computer readable storage medium is not a transitory signal per se, the program instructions executable by a processor to cause the processor to perform a method comprising:

accessing, by the processor on a first user device, content, wherein the content includes a security profile associated with the content;

displaying, on a first display for the first user device, the content;

receiving, by the first user device, an input, wherein the input comprises an alteration to the content, and wherein the input further comprises environmental data obtained from one or more sensors associated with the first user device;

analyzing the input to determine that the input is in compliance with the security profile associated with the content;

based at least in part on determining the input is not in compliance with the security profile associated with the content, transmitting a portion of the content to a second user device, wherein the portion of the content comprises the alteration to the content displayed on a second display for the second user device;

periodically obtaining, by the one or more sensors associated with the first user device, the environmental data while the content is being displayed, wherein the environmental data comprises facial recognition data associated with a location of the first device captured by the one or more sensors;

transmitting the portion of the content to the second user device based on determining that the environmental data is not in compliance with the security profile associated with the content, wherein determining that the environmental data is not in compliance with the security profile associated with the content comprises:
  analyzing the facial recognition data to determine an unauthorized viewer within view of the first user device; and
causing the second user device to vibrate based on the portion of the content being transmitted to the second user device.

15. The computer program product of claim 14 further comprising invoking a security measure for the content on the display for the first user device.

* * * * *